US011939137B2

(12) United States Patent
Li et al.

(10) Patent No.: US 11,939,137 B2
(45) Date of Patent: Mar. 26, 2024

(54) FLEXIBLE CONTAINER WITH DISPENSING PUMP

(71) Applicant: Dow Global Technologies LLC, Midland, MI (US)

(72) Inventors: Sheng Li, Shanghai (CN); Bin Li, Shanghai (CN); Brian W. Walther, Freeport, TX (US); Marc S. Black, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 416 days.

(21) Appl. No.: 17/294,561

(22) PCT Filed: Nov. 30, 2018

(86) PCT No.: PCT/CN2018/118395
§ 371 (c)(1),
(2) Date: May 17, 2021

(87) PCT Pub. No.: WO2020/107364
PCT Pub. Date: Jun. 4, 2020

(65) Prior Publication Data
US 2022/0017289 A1 Jan. 20, 2022

(51) Int. Cl.
*B65D 83/00* (2006.01)
*B05B 15/30* (2018.01)
(Continued)

(52) U.S. Cl.
CPC .......... *B65D 83/0055* (2013.01); *B05B 15/30* (2018.02); *B65D 75/008* (2013.01);
(Continued)

(58) Field of Classification Search
CPC .............. B65D 75/008; B65D 2207/00; B65D 83/0055; B65D 75/566; B65D 75/5883;
(Continued)

(56) References Cited

U.S. PATENT DOCUMENTS 4,264,019 A 4/1981 Roberts et al.
5,653,352 A 8/1997 Kim
(Continued)

FOREIGN PATENT DOCUMENTS

CN 202022460 U 11/2011
JP 2012-066849 A 4/2012
(Continued)

OTHER PUBLICATIONS

AR117154A1 English Comments and Summary of Substantive Examination Report dated Jul. 17, 2023.

*Primary Examiner* — Patrick M. Buechner
(74) *Attorney, Agent, or Firm* — Boyle Fredrickson, S.C.

(57) ABSTRACT

A flexible container (10) is disclosed. The flexible container (10) includes four panels (18, 20, 22, 24), each panel comprising a flexible multilayer film. Each flexible multilayer film is composed of a polymeric material. The four panels form (i) a body, (ii) a neck, and (iii) a handle. The handle (12) has an upper handle portion (**12*a*) and a pair of spaced-apart legs (13, 15). The legs extend from the upper handle portion to the body on opposing sides of the neck. The flexible container includes a fitment (70) sealed to the neck. The flexible container includes a dispensing pump (100**) attached to the fitment. The flexible container can provide a metered dose from a dispensing pump and the dispensing pump can also function as a handle to hand-carry the flexible container.

3 Claims, 10 Drawing Sheets

(51) Int. Cl.
*B65D 75/00* (2006.01)
*B65D 75/56* (2006.01)
*B65D 75/58* (2006.01)
*B05B 15/63* (2018.01)

(52) U.S. Cl.
CPC ....... *B65D 75/566* (2013.01); *B65D 75/5883* (2013.01); *B05B 15/63* (2018.02)

(58) Field of Classification Search
CPC ..... B05B 15/30; B05B 15/63; B05B 11/0037; B05B 11/10
See application file for complete search history.

(56) References Cited

U.S. PATENT DOCUMENTS

| | | | | |
|---|---|---|---|---|
| 5,783,638 | A | 7/1998 | Lai et al. | |
| 6,105,821 | A | 8/2000 | Christine et al. | |
| 6,206,243 | B1 * | 3/2001 | Schneider .......... | B65D 75/5883 222/105 |
| D608,656 | S | 1/2010 | Wilkes et al. | |
| 7,896,203 | B2 | 3/2011 | Myron | |
| 8,348,509 | B2 | 1/2013 | Wilkes et al. | |
| 8,840,305 | B2 | 9/2014 | Wilkes et al. | |
| 9,579,640 | B2 | 2/2017 | Gross et al. | |
| 10,099,817 | B2 | 10/2018 | Wilkes et al. | |
| 2003/0094464 | A1 * | 5/2003 | Decottignies ...... | B65D 75/5883 222/105 |
| 2003/0202719 | A1 * | 10/2003 | Wilkes ................ | B29C 66/1122 383/120 |
| 2004/0026459 | A1 * | 2/2004 | Clerget ............... | B05B 11/1052 222/321.9 |
| 2011/0056965 | A1 | 3/2011 | Peer et al. | |
| 2014/0209639 | A1 | 7/2014 | Sasaki et al. | |
| 2015/0114987 | A1 | 4/2015 | Pritchard | |
| 2015/0284143 | A1 | 10/2015 | Herisson | |
| 2015/0314919 | A1 | 11/2015 | Wilkes et al. | |
| 2016/0016695 | A1 * | 1/2016 | Pereira .................... | B29C 66/81 383/66 |
| 2016/0304254 | A1 * | 10/2016 | Bonekamp ......... | B65D 75/5883 |
| 2017/0129680 | A1 * | 5/2017 | Murray ................ | B65D 75/008 |
| 2018/0057225 | A1 * | 3/2018 | Schulz ................. | B65D 75/008 |

FOREIGN PATENT DOCUMENTS

| | | | |
|---|---|---|---|
| JP | 2017-218209 | A | 12/2017 |
| JP | 2018070253 | A | 5/2018 |
| KR | 20020023249 | A * | 3/2002 |
| WO | 2015/171171 | A1 | 11/2015 |

* cited by examiner

FLEXIBLE CONTAINER WITH DISPENSING PUMP

BACKGROUND

The present disclosure is directed to a flexible container with a dispensing pump and a standup flexible container with a dispensing pump in particular.

Flexible packaging is known to offer significant value and sustainability benefits to product manufacturers, retailers and consumers as compared to solid, molded plastic packaging containers. Flexible packaging provides many consumer conveniences and benefits, including extended shelf life, easy storage, microwave-ability, refill-ability, and reduced disposal (landfill) burden. Flexible packaging has proven to require less energy for creation and creates fewer emissions during disposal.

Flexible packaging includes flexible containers with a gusseted body section. These gusseted flexible containers are currently produced using flexible plastic films which are folded to form gussets and heat sealed in a perimeter shape. The gusseted body section opens to form a flexible container with a fillable interior volume. The gussets are terminated at the bottom of the container to form a substantially flat base, providing stability when the container is partially or wholly filled. The gussets can be terminated at the top of the container to form an open neck for receiving a rigid fitment and closure.

One shortcoming of the conventional flexible container is its inability to provide conveniently a metered dose of liquid (fluid content) therefrom. The art recognizes the need for a flexible container with the ability to conveniently, accurately, and quickly dispense a metered dose of the fluid content contained therein.

SUMMARY

The present disclosure provides a flexible container. In an embodiment, the flexible container includes (A) four panels, each panel comprising a flexible multilayer film. Each flexible multilayer film is composed of a polymeric material. The four panels form (i) a body, (ii) a neck, and (iii) a handle. The handle has an upper handle portion and a pair of spaced-apart legs. The legs extend from the upper handle portion to the body on opposing sides of the neck. The flexible container includes (B) a fitment sealed to the neck. The flexible container includes (C) a dispensing pump attached to the fitment.

An advantage of the present disclosure is a flexible container with the ability to provide a metered dose from a dispensing pump.

An advantage of the present disclosure is a flexible container with a dispensing pump the dispensing pump dispensing a metered dose of fluid content; the dispensing pump also functioning as a handle to hand-carry the flexible container.

DETAILED DESCRIPTION

The present disclosure provides a flexible container. In an embodiment, the flexible container includes (A) four panels. Each panel includes a flexible multilayer film composed of a polymeric material. The four panels form (i) a body, (ii) a neck, and (iii) a handle. The handle has an upper handle portion and a pair of spaced-apart legs. The legs extend from the upper handle portion to the body on opposing sides of the neck. The flexible container further includes (B) a fitment sealed to the neck. The flexible container further includes (C) a dispensing pump attached to the fitment.

1. Flexible Container

Figure 1:
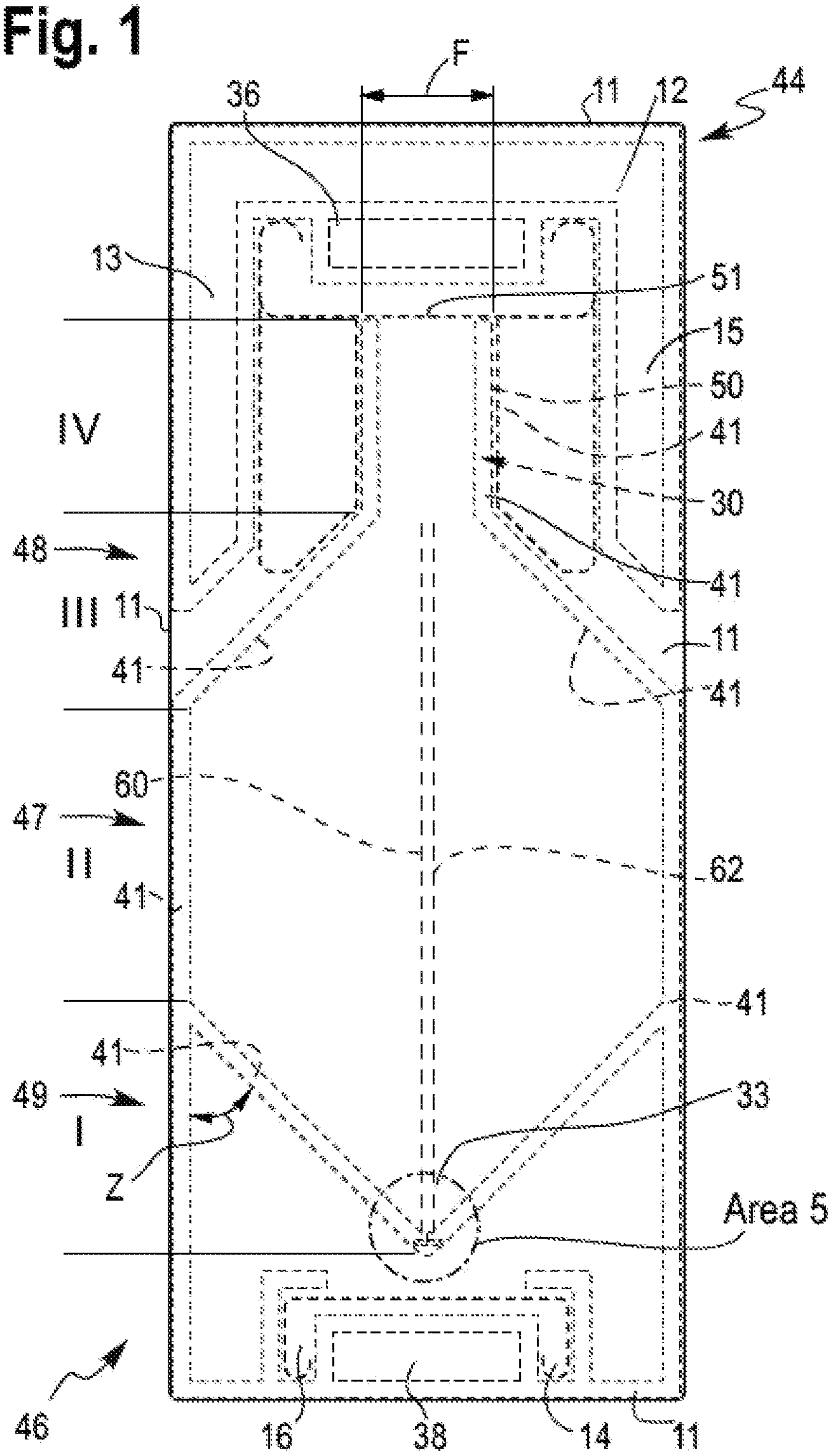
FIG. 1 is a front elevation view of a flexible container in a collapsed configuration in accordance with an embodiment of the present disclosure.

The flexible container includes panels, each panel composed of a flexible multilayer film. The flexible container can be made from one, two, three, four, five, six, or more panels. In an embodiment, the flexible container 10 has a collapsed configuration (as shown in FIG. 1) and has an expanded configuration (shown in FIGS. 3, 7, 9). FIG. 1 shows the flexible container 10 having a bottom section I, a body section II, a tapered transition section III, and a neck section IV. In the expanded configuration, the bottom section I forms a bottom segment 26, as shown in FIG. 4. The body section II forms a body portion. The tapered transition section III forms a tapered transition portion. The neck section IV forms a neck portion.

In an embodiment, the flexible container 10 is made from four panels, as shown in FIGS. 1-9. During the fabrication process, the panels are formed when one or more webs of film material are sealed together. While the webs may be separate pieces of film material, it will be appreciated that any number of the seams between the webs could be "pre-made," as by folding one or more of the source webs to create the effect of a seam or seams. For example, if it were desired to fabricate the present flexible container from two webs instead of four, the bottom, left center, and right center webs could be a single folded web, instead of three separate webs. Similarly, one, two, or more webs may be used to produce each respective panel (i.e., a bag-in-a-bag configuration or a bladder configuration).

Figure 2:
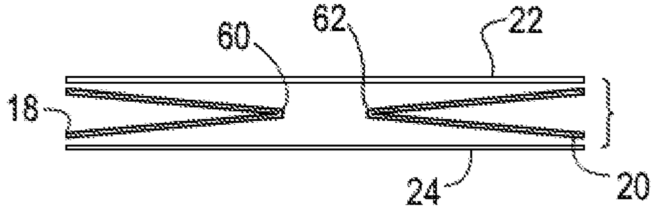
FIG. 2 is an exploded side elevation view of a panel sandwich.

FIG. 2 shows the relative positions of the four webs as they form four panels (in a "one up" configuration) as they pass through the fabrication process. For clarity, the webs are shown as four individual panels, the panels separated and the heat seals not made. The constituent webs form first gusset panel 18, second gusset panel 20, front panel 22 and rear panel 24. The panels 18-24 area multilayer film, as discussed in detail below. The gusset fold lines 60 and 62 are shown in FIGS. 1 and 2.

As shown in FIG. 2, the folded gusset panels 18, 20 are placed between the rear panel 24 and the front panel 22 to form a "panel sandwich." The gusset panel 18 opposes the gusset panel 20. The edges of the panels 18-24 are configured, or otherwise arranged, to form a common periphery 11 as shown in FIG. 1. The flexible multilayer film of each panel web is configured so that the heat seal layers face each other. The common periphery 11 includes the bottom seal area including the bottom end of each panel.

When the flexible container 10 is in the collapsed configuration, the flexible container is in a flattened state, or in an otherwise evacuated state. The gusset panels 18, 20 fold inwardly (dotted gusset fold lines 60, 62 of FIG. 1) and are sandwiched by the front panel 22 and the rear panel 24.

Figure 3:
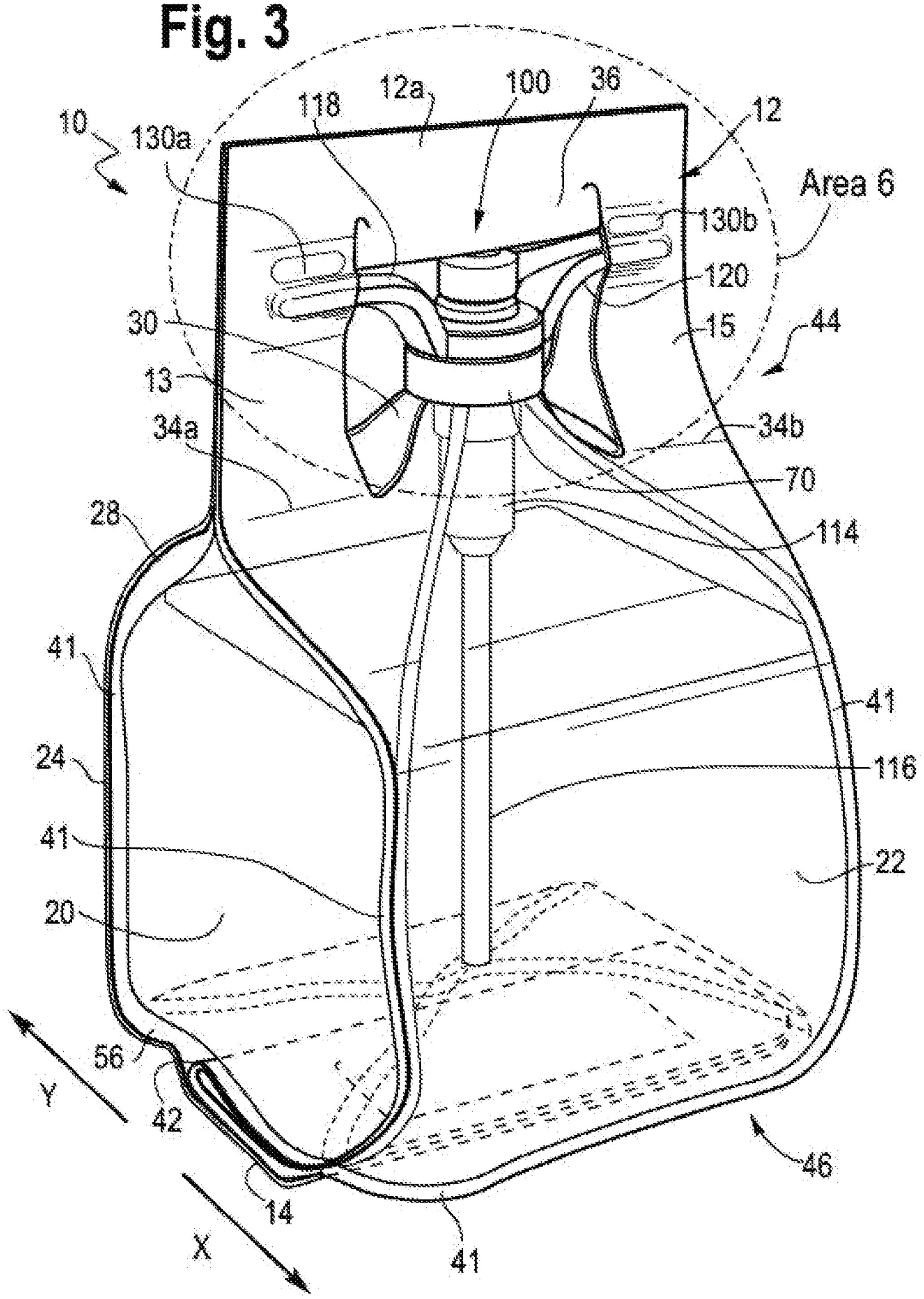
FIG. 3 is a perspective view of the flexible container of FIG. 1 in an expanded configuration with a dispensing pump, in accordance with an embodiment of the present disclosure.
Figure 4:
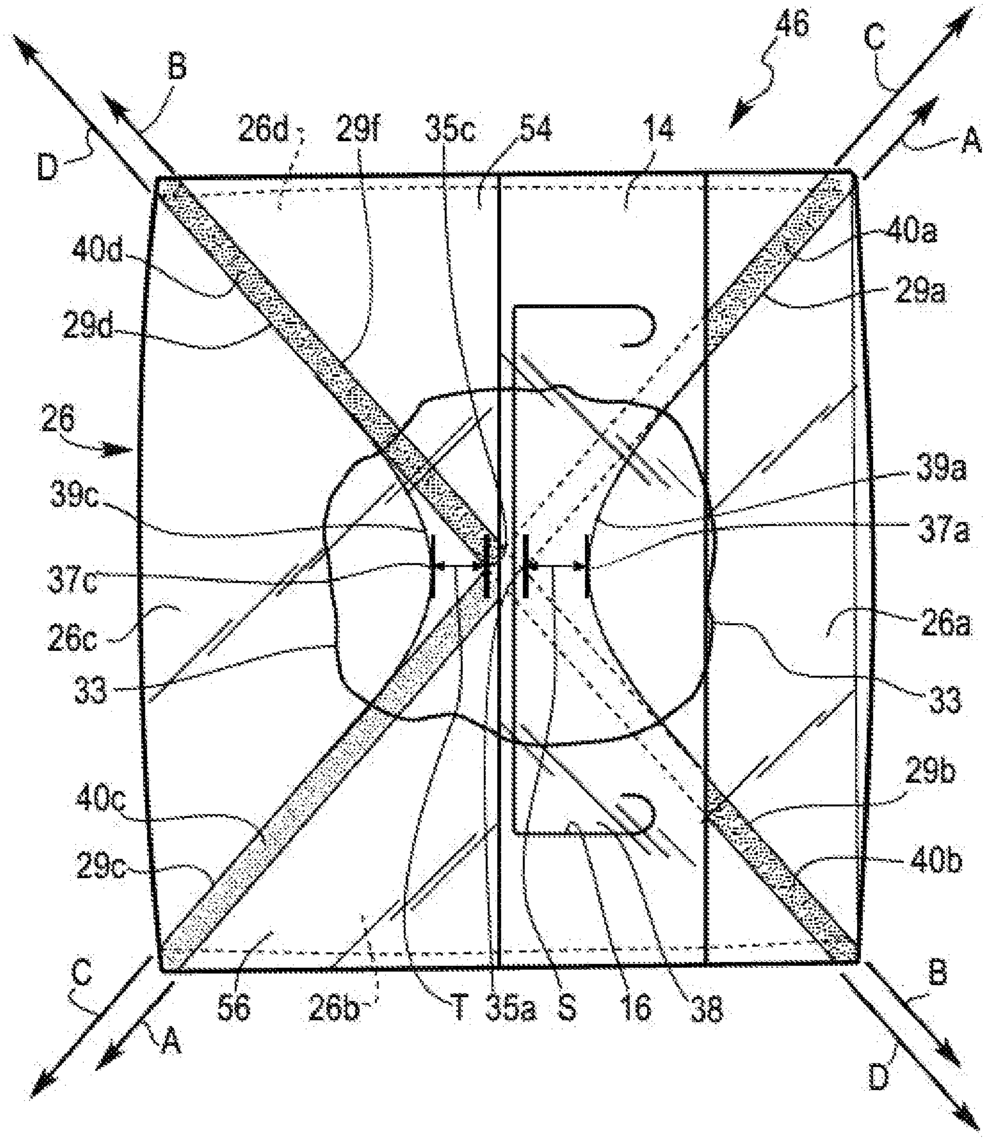
FIG. 4 is a bottom plan view of the expanded flexible container of FIG. 3 in accordance with an embodiment of the present disclosure.
Figure 7:
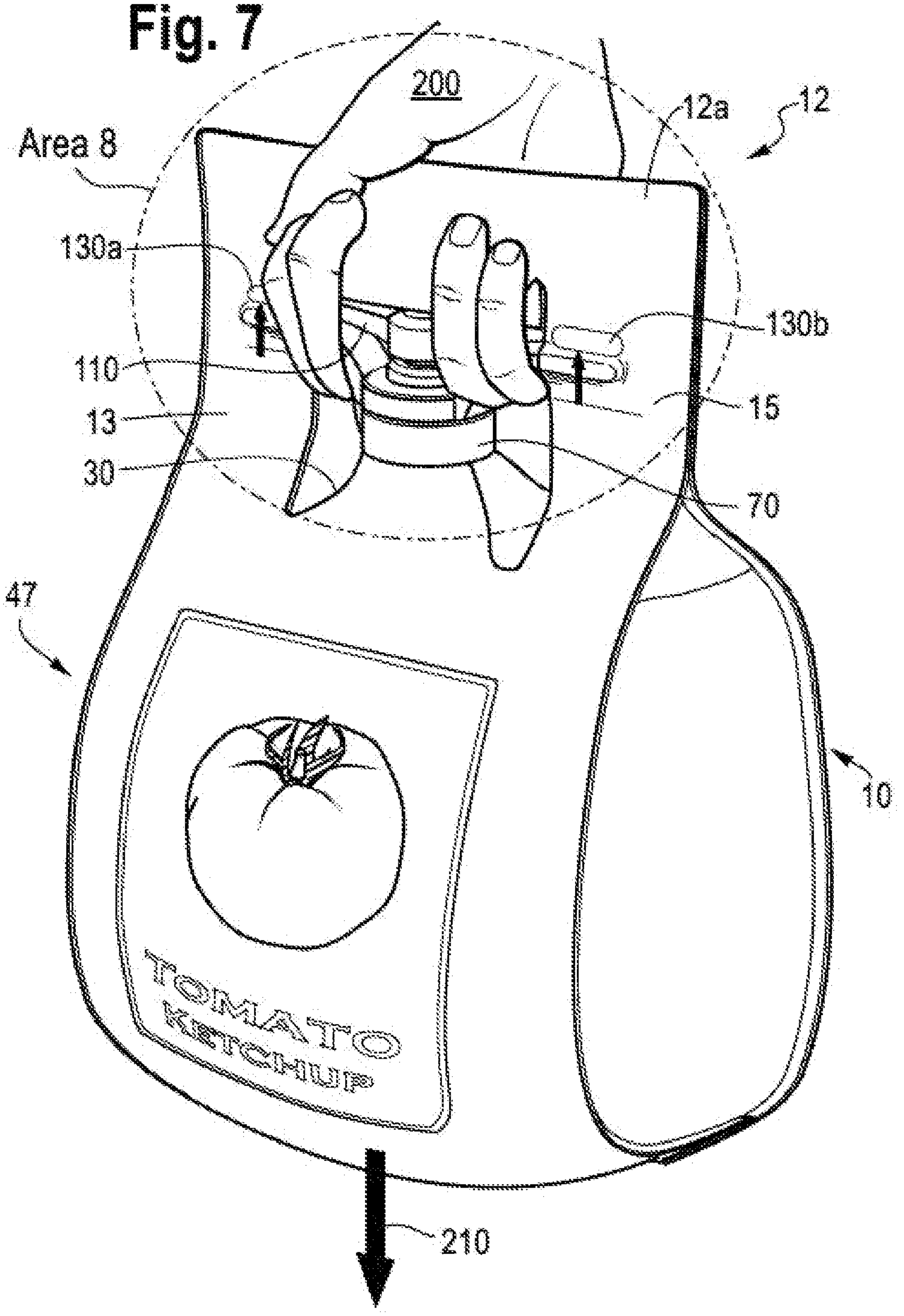
FIG. 7 is a perspective view of the flexible container in a transport configuration, in accordance with an embodiment of the present disclosure.
Figure 9:
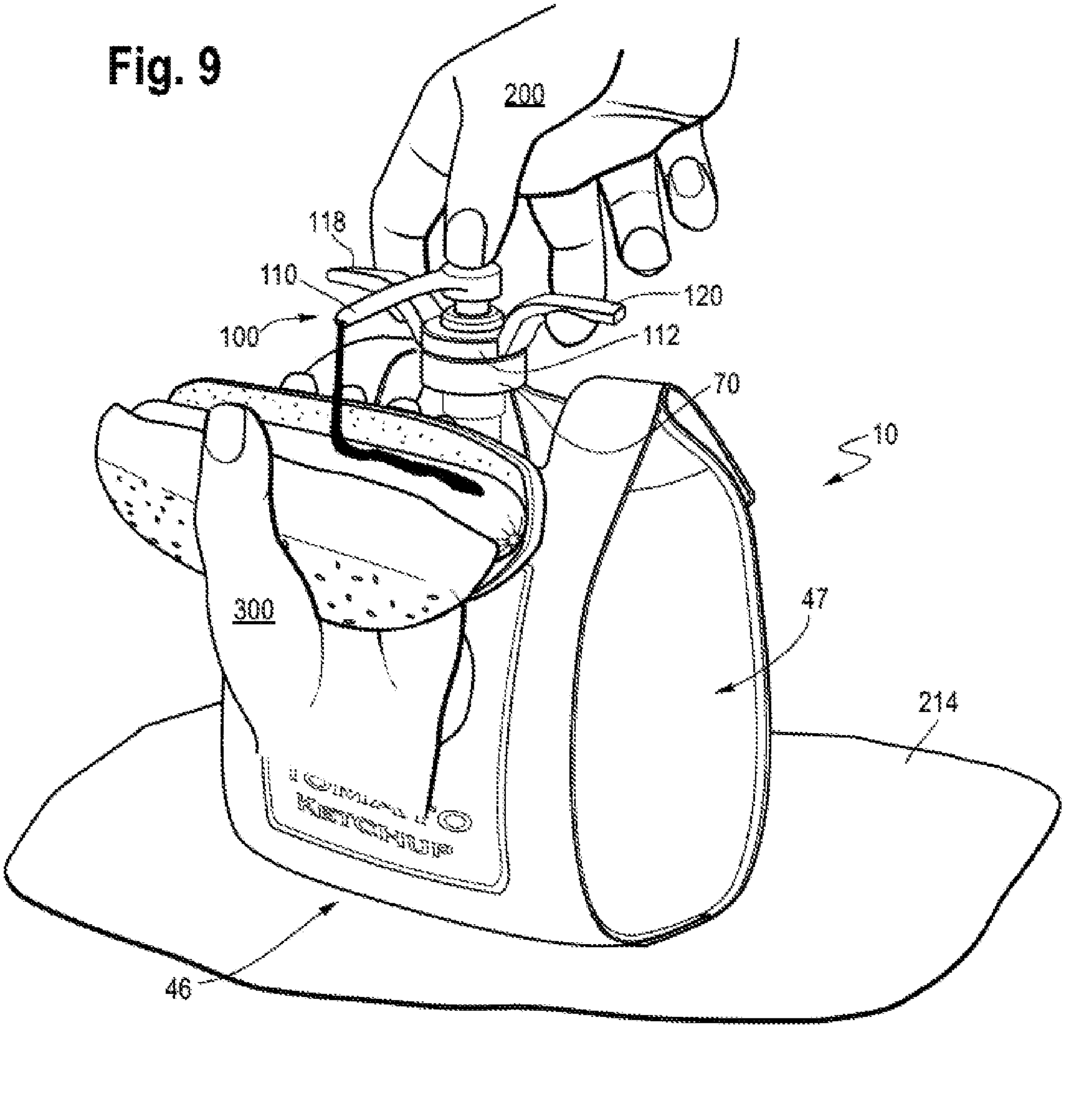
FIG. 9 is a perspective view of the flexible container in the dispensing configuration, in accordance with an embodiment of the present disclosure.

FIGS. 3, 7, 9 show flexible container 10 in the expanded configuration. The flexible container 10 has four panels, a front panel 22, a rear panel 24, a first gusset panel 18 and a second gusset panel 20. The four panels 18, 20, 22, and 24 form the body section II and extend toward a top end 44 and extend toward a bottom end 46 of the container 10. Sections III and IV (respective tapered transition section, neck section) form a top segment 28. Section I (bottom section) forms a bottom segment 26.

The four panels 18, 20, 22 and 24 can each be composed of a separate web of film material. The composition and structure for each web of film material can be the same or different. Alternatively, one web of film material may also be used to make all four panels and the top and bottom segments. In a further embodiment, two or more webs can be used to make each panel.

In an embodiment, four webs of film material are provided, one web of film for each respective panel 18, 20, 22, and 24. The process includes sealing edges of each film to the adjacent web of film to form peripheral seals 41 and peripheral tapered seals 40*a*-40*d* (40) (FIGS. 1, 3). The peripheral tapered seals 40*a*-40*d* are located on the bottom segment 26 of the container, as shown in FIG. 4, and have an inner edge 29*a*-29*f*. The peripheral seals 41 are located on the side edges of the container 10, as shown in FIG. 3. Consequently, the process includes forming a closed bottom section I, a closed body section II, and a closed tapered transition section III.

To form the top segment 28 and the bottom segment 26, the four webs of film converge together at the respective end and are sealed together. For instance, the top segment 28 can be defined by extensions of the panels sealed together at the tapered transition section III, and the neck section IV. The top end 44 includes four top panels of film that define the top segment 28. The four top panels corresponding to respective front, rear, and first and second gusset panels. The bottom segment 26 can be defined by extensions of the panels sealed together at the bottom section I. The bottom segment 26 can also have four bottom panels 26*a*-26*d* of film sealed together and can also be defined by extensions of the panels at the opposite end 46, as shown in FIG. 4.

The neck 30 is positioned at a midpoint of the top segment 28. The neck 30 may (or may not) be sized smaller than a width of the body section II, such that the neck 30 can have an area that is less than a total area of the top segment 28. The location of the neck 30 can be anywhere on the top segment 28 of the container 10.

In an embodiment, the neck 30 is formed from two or more panels. In a further embodiment, the neck 30 is formed from four panels.

In an embodiment, the neck 30 is sized to accommodate a dispensing pump.

FIGS. 1 and 3 show the flexible container 10 with a top handle 12 and a bottom handle 14. It is understood that handle 14 is optional.

Figure 5:
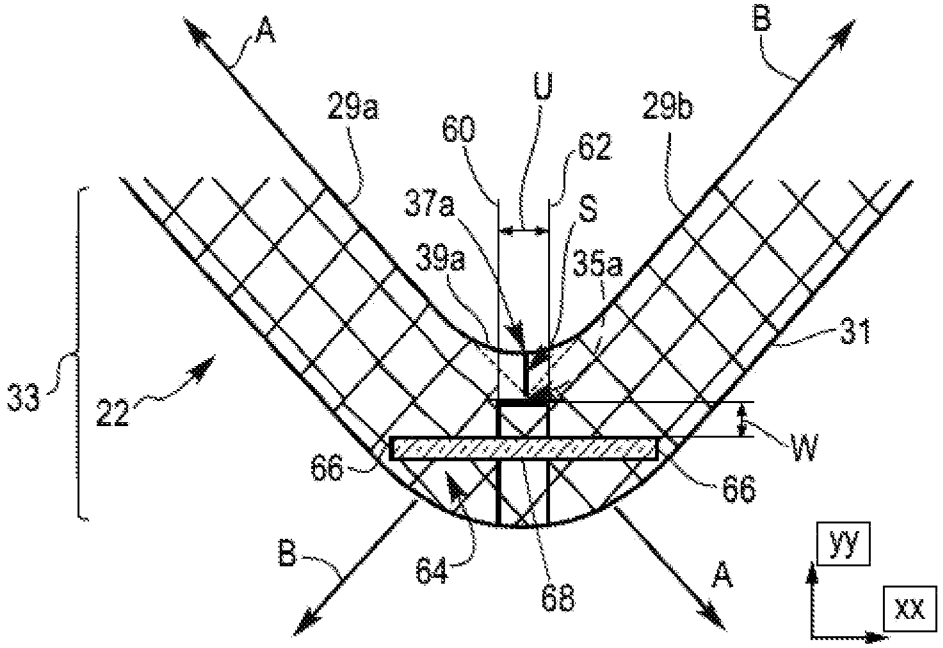
FIG. 5 is an enlarged view of Area 5 of FIG. 1.

The four panels of film that form the flexible container 10 extend from the body section II (forming body 47), to the tapered transition section III (forming tapered transition portion 48), to form a neck 30 (in the neck section IV). The four panels of film also extend from the body section II to the bottom section I (forming bottom portion 49). When the flexible container 10 is in the collapsed configuration (FIG. 1), the neck 30 has a width, F, that is less than the width of the tapered transition section III. The neck 30 includes a neck wall 50. FIGS. 1 and 3 show the neck wall 50 forms an open end 51 for access into the flexible container interior. The panels are sealed together to form a closed bottom section I, a closed body section II, and a closed tapered transition section III. Nonlimiting examples of suitable heating procedures include heat sealing and/or ultrasonic sealing. When the flexible container 10 is in the expanded configuration, the open end 51 of the neck wall 50 is open or is otherwise unsealed. When the flexible container 10 is in the collapsed configuration, the open end 51 is unsealed and is openable. The open end 51 permits access to the container interior through the neck wall 50 and the neck 30 as shown in FIGS. 3 and 5.

As shown in FIGS. 1, 3-4, the flexible bottom handle 14 can be positioned at a bottom end 46 of the container 10 such that the bottom handle 14 is an extension of the bottom segment 26.

Each panel includes a respective bottom face. FIG. 4 shows four triangle-shaped bottom faces 26*a*-26*d*, each bottom face being an extension of a respective film panel. The bottom faces 26*a*-26*d* make up the bottom segment 26. The four panels 26*a*-26*d* come together at a midpoint of the bottom segment 26. The bottom faces 26*a*-26*d* are sealed together, such as by using a heat-sealing technology, to form the bottom handle 14. For instance, a weld can be made to form the bottom handle 14, and to seal the edges of the bottom segment 26 together. Nonlimiting examples of suitable heat-sealing technologies include hot bar sealing, hot die sealing, impulse sealing, high frequency sealing, or ultrasonic sealing methods.

Figure 6:
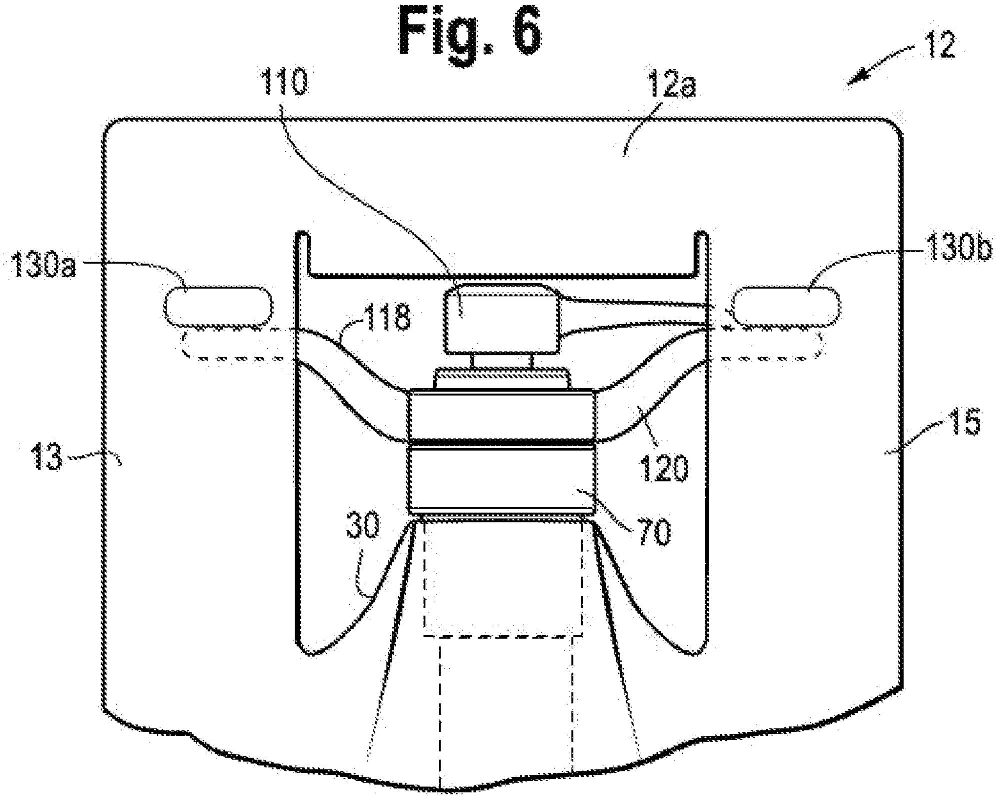
FIG. 6 is an elevation view of Area 6 of FIG. 3.

FIG. 4 shows bottom segment 26. Each panel 18, 20, 22, 24 has a respective bottom face 26*a*-26*d* that is present in the bottom segment 26. Each bottom face is bordered by two opposing peripheral tapered seals 40*a*-40*d*. Each peripheral tapered seal 40*a*-40*d* extends from a respective peripheral seal 41. The peripheral tapered seals for the front panel 22 and the rear panel 24 have an inner edge 29*a*-29*d* (FIG. 4) and an outer edge 31 (FIG. 6). The peripheral tapered seals 40*a*-40*d* converge at a bottom seal area 33 (FIGS. 1, 4, 6).

The front panel bottom face 26*a* includes a first line A defined by the inner edge 29*a* of the first peripheral tapered seal 40*a* and a second line B defined by the inner edge 29*b* of the second peripheral tapered seal 40*b*. The first line A intersects the second line B at an apex point 35*a* in the bottom seal area 33. The front panel bottom face 26*a* has a bottom distalmost inner seal point 37*a* ("BDISP 37*a*"). The BDISP 37*a* is located on the inner edge.

The apex point 35*a* is separated from the BDISP 37*a* by a distance S from 0 millimeter (mm) to less than 8.0 mm.

In an embodiment, the rear panel bottom face 26*c* includes an apex point 35*c* similar to the apex point 35*c* on the front panel bottom face 26*a*. The rear panel bottom face 26*c* includes a first line C defined by the inner edge of the 29*c* first peripheral tapered seal 40*c* and a second line D defined by the inner edge 29*d* of the second peripheral tapered seal 40*d*. The first line C intersects the second line D at an apex point 35*c* in the bottom seal area 33. The rear panel bottom face 26*c* has a bottom distalmost inner seal point 37*c* ("BDISP 37*c*"). The BDISP 37*c* is located on the inner edge. The apex point 35*c* is separated from the BDISP 37*c* by a distance T from 0 millimeter (mm) to less than 8.0 mm.

It is understood the following description to the front panel bottom face 26*a* applies equally to the rear panel bottom face 26*c*, with reference numerals to the rear panel bottom face 26*c* shown in adjacent closed parentheses.

In an embodiment, the BDISP 37*a* (37*c*) is located where the inner edges 29*a* (29*c*) and 29*b* (29*d*) intersect. The distance S (distance T) between the BDISP 37*a* (37*c*) and the apex point 35*a* (35*c*) is 0 mm.

In an embodiment, the inner seal edge diverges from the inner edges 29*a*, 29*b* (29*c*, 29*d*), to form an inner seal arc 39*a* (front panel) and inner seal arc 39*c* (rear panel) as shown in FIGS. 4 and 6. The BDISP 37*a* (37*c*) is located on the inner seal arc 39*a* (39*c*). The apex point 35*a* (apex point 35*c*) is separated from the BDISP 37*a* (BDISP 37*c*) by the distance S (distance T), which is from greater than 0 mm, or 0.5 mm, or 1.0 mm, or 2.0 mm, or 2.6 mm, or 3.0 mm, or 3.5 mm, or 3.9 mm to 4.0 mm, or 4.5 mm, or 5.0 mm, or 5.2 mm, or 5.3 mm, or 5.5 mm, or 6.0 mm, or 6.5 mm, or 7.0 mm, or 7.5 mm, or 7.9 mm.

In an embodiment, apex point 35*a* (35*c*) is separated from the BDISP 37*a* (37*c*) by the distance S (distance T), which is from greater than 0 mm to less than 6.0 mm.

In an embodiment, the distance S (distance T) from the apex point 35*a* (35*c*) to the BDISP 37*a* (37*c*) is from greater than 0 mm, or 0.5 mm or 1.0 mm, or 2.0 mm to 4.0 mm, or 5.0 mm, or less than 5.5 mm.

In an embodiment, apex point 35*a* (apex point 35*c*) is separated from the BDISP 37*a* (BDISP 37*c*) by the distance S (distance T), which is from 3.0 mm, or 3.5 mm, or 3.9 mm to 4.0 mm, or 4.5 mm, or 5.0 mm, or 5.2 mm, or 5.3 mm, or 5.5 mm.

In an embodiment, the distal inner seal arc 39*a* (39*c*) has a radius of curvature from 0 mm, or greater than 0 mm, or 1.0 mm to 19.0 mm, or 20.0 mm.

In an embodiment, each peripheral tapered seal 40*a*-40*d* (outside edge) and an extended line from respective peripheral seal 41 (outside edge) form an angle Z, as shown in FIG. 1. The angle Z is from 40°, or 42°, or 44°, or 45° to 46°, or 48°, or 50°. In an embodiment, angle Z is 45°.

The bottom segment 26 includes a pair of gussets 54 and 56 formed there at, which are essentially extensions of the bottom faces 26*a*-26*d*. The gussets 54 and 56 can facilitate the ability of the flexible container 10 to stand upright. These gussets 54 and 56 are formed from excess material from each bottom face 26*a*-26*d* that are joined together to form the gussets 54 and 56. The triangular portions of the gussets 54 and 56 comprise two adjacent bottom segment panels sealed together and extending into its respective gusset. For example, adjacent bottom faces 26*a* and 26*d* extend beyond the plane of their bottom surface along an intersecting edge and are sealed together to form one side of a first gusset 54. Similarly, adjacent bottom faces 26*c* and 26*d* extend beyond the plane of their bottom surface along an intersecting edge and are sealed together to form the other side of the first gusset 54. Likewise, a second gusset 56 is similarly formed from adjacent bottom faces 26*a*-26*b* and 26*b*-26*c*. The gussets 54 and 56 can contact a portion of the bottom segment 26, where the gussets 54 and 56 can contact bottom faces 26*b* and 26*d* covering them, while bottom segment panels 26*a* and 26*c* remain exposed at the bottom end 46.

As shown in FIGS. 3-4, the gussets 54 and 56 of the flexible container 10 can further extend into the bottom handle 14. In the aspect where the gussets 54 and 56 are positioned adjacent bottom segment panels 26*b* and 26*d*, the bottom handle 14 can also extend across bottom faces 26*b* and 26*d*, extending between the pair of panels 18 and 20. The bottom handle 14 can be positioned along a center portion or midpoint of the bottom segment 26 between the front panel 22 and the rear panel 24.

The top handle 12 and the bottom handle 14 can comprise up to four plies of film sealed together for a four panel container 10. When more than four panels are used to make the container, the handles 12, 14 can include the same number of panels used to produce the container. Any portion of the handles 12, 14 where all four plies are not completely sealed together by the heat-sealing method, can be adhered together in any appropriate manner, such as by a tack seal to form a fully-sealed multilayer handle. Alternatively, the top handle 12 can be made from as few as a single ply of film from one panel only or can be made from only two plies of film from two panels. The handles 12, 14 can have any suitable shape and generally will take the shape of the film end. For example, typically the web of film has a rectangular shape when unwound, such that its ends have a straight edge. Therefore, the handles 12, 14 would also have a rectangular shape.

Additionally, the bottom handle 14 can contain a handle opening 16 or cutout section therein sized to fit a user's hand, as can be seen in FIG. 1. The handle opening 16 can be any shape that is convenient to fit the hand and, in one aspect, the handle opening 16 can have a generally oval shape. In another embodiment, the handle opening 16 can have a generally rectangular shape. Additionally, the handle opening 16 of the bottom handle 14 can also have a flap 38 that comprises the cut material that forms the handle opening 16. To define the handle opening 16, the bottom handle 14 can have a section that is cut out of the multilayer bottom handle 14 along three sides or portions while remaining attached at a fourth side or lower portion. This provides a flap of material 38 that can be pushed through the handle opening 16 by the user and folded over an edge of the handle opening 16 to provide a relatively smooth gripping surface at an edge that contacts the user's hand. If the flap of material 38 were completely cut out, this would leave an exposed fourth side or lower edge that could be relatively sharp and could possibly cut or scratch the hand when placed there.

Furthermore, a portion of the bottom handle 14 attached to the bottom segment 26 can contain a dead machine fold 42 or a score line that provides for the bottom handle 14 to consistently fold in the same direction, as illustrated in FIG. 3. The machine fold 42 can comprise a fold line that permits folding in a first direction X toward the front panel 22 and restricts folding in a second direction Y toward the rear panel 24. The term "restricts," as used throughout this application, can mean that it is easier to move in one direction, or the first direction X, than in an opposite direction, such as the second direction Y. The machine fold 42 can cause the bottom handle 14 to consistently fold in the first direction X because it can be thought of as providing a generally permanent fold line in the bottom handle 14 that is predisposed to fold in the first direction X, rather than in the second direction Y. This machine fold 42 of the bottom handle 14 can serve multiple purposes, one being that when a user is transferring the product from the container 10 they can grasp the bottom handle 14 and it will easily bend in the first direction X to assist in pouring. Secondly, when the flexible container 10 is stored in an upright position, the machine fold 42 in the bottom handle 14 encourages the bottom handle 14 to fold in the first direction X along the machine fold 42, such that the bottom handle 14 can fold underneath the container 10 adjacent one of the bottom segment panels 26*a*, as shown in FIG. 4. The weight of the product can also apply a force to the bottom handle 14, such that the weight of the product can further press on the bottom handle 14 and maintain the bottom handle 14 in the folded position in the first direction X. As will be discussed herein, the top handle 12 can also contain a similar machine fold 34*a*, 34*b* that also allows it to fold consistently in the same first direction X as the bottom handle 14.

Additionally, as the flexible container 10 is evacuated and less product remains, the bottom handle 14 can continue to provide support to help the flexible container 10 to remain standing upright unsupported and without tipping over. Because the bottom handle 14 is sealed generally along its entire length extending between the pair of gusset panels 18 and 20, it can help to keep the gussets 54 and 56 (FIGS. 3, 4) together and continue to provide support to stand the container 10 upright, even as the container 10 is emptied.

As seen in FIGS. 1 and 3, the top handle 12 can extend from the top segment 28 and, in particular, can extend from the four panels that make up the top segment 28. The four panels of film that extend into the top handle 12 are all sealed together to form a multilayer top handle 12. The top handle 12 can have a U-shape and, in particular, an upside down U-shape with a horizontal upper handle portion 12*a* having two pairs of spaced legs 13 and 15 extending therefrom. The pair of legs 13 and 15 extends from the top segment 28, adjacent the neck 30.

A portion of the top handle 12 can extend above the neck 30 and above the top segment 28 when the top handle 12 is extended in a position perpendicular to the top segment 28 and, in particular, the entire upper handle portion 12*a* can be above the neck wall 50 and the top segment 28. The two pairs of legs 13 and 15 along with the upper handle portion 12*a* together make up the top handle 12 surrounding a handle opening that allows a user to place their hand therethrough and grasp the upper handle portion 12*a* of the handle 12.

As with the bottom handle 14, the top handle 12 also can have a dead machine fold 34*a*, 34*b* that permits folding in a first direction toward the front side panel 22 and restricts folding in a second direction toward the rear side panel 24, as shown in FIG. 3. The machine fold 34*a*, 34*b* can be located in each of the pair of legs 13, 15 at a location where the seal begins. The top handle 12 can be adhered together, such as with a tack adhesive, for example. The machine fold 34*a*, 34*b* in the top handle 12 can allow for the top handle 12 to be inclined to fold or bend consistently in the same first direction X as the bottom handle 14, rather than in the second direction Y. As shown in FIGS. 1 and 3, the top handle 12 can likewise contain a flap portion 36 that folds upwards toward the upper handle portion 12*a* of the top handle 12 to create a smooth gripping surface of the top handle 12, as with the bottom handle 14, such that the handle material is not sharp and can protect the user's hand from getting cut on any sharp edges of the top handle 12.

When the container 10 is in a rest position, such as when it is standing upright on its bottom segment 26, as shown in FIG. 3, the bottom handle 14 can be folded underneath the container 10 along the bottom machine fold 42 in the first direction X, so that it is parallel to the bottom segment 26 and adjacent bottom panel 26*a*, and the top handle 12 will automatically fold along its machine fold 34*a*, 34*b* in the same first direction X, with a front surface of the top handle 12 parallel to a panel 28*a* of the top segment 28. The top handle 12 folds in the first direction X, rather than extending straight up, perpendicular to the top segment 28, because of the machine fold 34*a*, 34*b*. Both handles 12 and 14 are inclined to fold in the same direction X, such that upon dispensing, the handles can fold the same direction, relatively parallel to its respective end panel or end segment, to make dispensing easier and more controlled. Therefore, in a rest position, the handles 12 and 14 are both folded generally parallel to one another. Additionally, the container 10 can stand upright even with the bottom handle 14 positioned underneath the upright container 10.

The material of construction of the flexible container 10 can comprise food-grade plastic. For instance, nylon, polypropylene, polyethylene such as high density polyethylene (HDPE) and/or low density polyethylene (LDPE) may be used, as discussed later. The film of the plastic container 10 can have a thickness and barrier properties that are adequate to maintain product and package integrity during manufacturing, distribution, product shelf life and customer usage. In an embodiment, the flexible multilayer film has a thickness from 100 micrometers (μm), or 200 μm, or 250 μm to 300 μm, or 350 μm, or 400 μm. In an embodiment, the film material can also be such that it provides the appropriate atmosphere within the flexible container 10 to maintain the product shelf life of at least about 180 days. Such films can comprise an oxygen barrier film, such as a film having a low oxygen transmission rate (OTR) from greater than 0 to 0.4 $cc/m^2/atm/24$ hrs at 23° C. and 80% relative humidity (RH). Additionally, the flexible multilayer film can also comprise a water vapor barrier film, such as a film having a low water vapor transmission rate (WVTR) from greater than 0 to 15 $g/m^2/24$ hrs at 38° C. and 90% RH. Moreover, it may be desirable to use materials of construction having oil and/or chemical resistance particularly in the seal layer, but not limited to just the seal layer. The flexible multilayer film can be either printable or compatible to receive a pressure sensitive label or other type of label for displaying of indicia on the flexible container 10. In an embodiment, the film can also be made of non-food grade resins for producing containers for materials other than food.

In an embodiment, each panel is made from a flexible multilayer film having at least one, or at least two, or at least three layers. The flexible multilayer film is resilient, flexible, deformable, and pliable. The structure and composition of the flexible multilayer film for each panel 18, 20, 22, 24 may be the same or different. For example, each of the four panels 18, 20, 22, 24 can be made from a separate web, each web having a unique structure and/or unique composition, finish, or print. Alternatively, each of the four panels 18, 20, 22, 24 can be the same structure and the same composition.

In an embodiment, each panel 18, 20, 22, 24 is a flexible multilayer film having the same structure and the same composition.

The flexible multilayer film may be (i) a coextruded multilayer structure or (ii) a laminate, or (iii) a combination of (i) and (ii). In an embodiment, the flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or ten, or eleven, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and/or optical properties.

In another embodiment, the flexible multilayer film can comprise a bladder, wherein two or more films that are adhered in such a manner as to allow some delamination of one or more plies to occur during a significant impact such that the inside film maintains integrity and continues to hold contents of the container.

The flexible multilayer film is composed of a polymeric material. Nonlimiting examples of suitable polymeric materials for the seal layer include olefin-based polymer (including any ethylene/$C_3$-$C_{10}$ $\alpha$-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE")), ethylene-acrylic acid or ethylene-methacrylic acid and their ionomers with zinc, sodium, lithium, potassium, magnesium salts, ethylene vinyl acetate copolymers, and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like), propylene-based plastomers (e.g., VERSIFY™ or VISTAMAX™)), polyamides (such as Nylon 6; Nylon 6,6; Nylon 6,66; Nylon 6,12; Nylon 12; etc.), polyethylene norbornene, cyclic olefin copolymers, polyacrylonitrile, polyesters, copolyesters (such as polyethylene terephthlate glycol-modified (PETG)), cellulose esters, polyethylene and copolymers of ethylene (e.g., LLDPE based on ethylene octene copolymer such as DOWLEX™), blends thereof; and multilayer combinations thereof.

Nonlimiting examples of suitable polymeric materials for the tie layer include functionalized ethylene-based polymers such as ethylene-vinyl acetate (EVA) copolymer, polymers with maleic anhydride-grafted to polyolefins such as any polyethylene, ethylene-copolymers, or polypropylene, and ethylene acrylate copolymers such an ethylene methyl acrylate (EMA) copolymer, glycidyl containing ethylene copolymers, propylene and ethylene based olefin block copolymers (OBC) such as INTUNET™ (PP-OBC) and INFUSE™ (PE-OBC), both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN resins available from The Dow Chemical Company); vinylethylene vinyl alcohol (EVOH) copolymer; and metal foil (such as aluminum foil). Alternatively, modified polymeric films such as vapor deposited aluminum or silicon oxide on such films as BON, OPET, or oriented polypropylene (OPP), can be used to obtain barrier properties when used in laminate multilayer film.

In an embodiment, the flexible multilayer film includes a seal layer selected from LLDPE (sold under the trade name DOWLEX™ (The Dow Chemical Company)); single-site LLDPE; substantially linear, or linear ethylene alpha-olefin copolymers, including polymers sold under the trade name AFFINITY™ or ELITE™ (The Dow Chemical Company) for example; propylene-based plastomers or elastomers such as VERSIFY™ (The Dow Chemical Company); and blends thereof. An optional tie layer is selected from either ethylene-based olefin block copolymer PE-OBC (sold as INFUSE™) or propylene-based olefin block copolymer PP-OBC (sold as INTUNET™). The outer layer includes greater than 50 wt % of resin(s) having a melting point, Tm, that is from 25° C., to 30° C., or 40° C. higher than the melting point of the polymer in the seal layer, wherein the outer layer polymer is selected from resins such as VERSIFY™ or VISTAMAX™, ELITE™, HDPE or a propylene-based polymer such as propylene homopolymer, propylene impact copolymer or TPO.

In an embodiment, the flexible multilayer film is coextruded.

In an embodiment, flexible multilayer film includes a seal layer selected from LLDPE (sold under the trade name DOWLEX™ (The Dow Chemical Company)); single-site LLDPE; substantially linear, or linear, olefin polymers, including polymers sold under the trade name AFFINITY™ or ELITE™ (The Dow Chemical Company) for example; propylene-based plastomers or elastomers such as VERSIFY™ (The Dow Chemical Company); and blends thereof. The flexible multilayer film also includes an outer layer that is a polyamide.

In an embodiment, the flexible multilayer film is a coextruded film and includes:

(i) a seal layer composed of an olefin-based polymer having a first melt temperature less than 105° C., (Tm1); and (ii) an outer layer composed of a polymeric material having a second melt temperature, (Tm2), wherein Tm2−Tm1>40° C.

The term "Tm2−Tm1" is the difference between the melt temperature of the polymer in the outer layer and the melt temperature of the polymer in the seal layer, and is also referred to as "ΔTm." In an embodiment, the ΔTm is from 41° C., or 50° C., or 75° C., or 100° C. to 125° C., or 150° C., or 175° C., or 200° C.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$ and the outer layer is composed of a polyamide having a Tm from 170° C. to 270° C.

In an embodiment, the flexible multilayer film is a coextruded and/or laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm$^3$, or from 0.875 to 0.910 g/cm$^3$, or from 0.888 to 0.900 g/cm$^3$ and an outermost layer composed of a material selected from LLDPE, OPET, OPP (oriented polypropylene), BOPP, polyamide, and combinations thereof.

In an embodiment, the flexible multilayer film is a coextruded and/or laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film includes a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a heat seal initiation temperature (HSIT) from 65° C. to less than 125° C. Applicant discovered that the seal layer with an ethylene-based polymer with a HSIT from 65° C. to less than 125° C. advantageously enables the formation of secure seals and secure sealed edges around the complex perimeter of the flexible container. The ethylene-based polymer with HSIT from 65° C. to less than 125° C. is a robust sealant which also allows for better sealing to the rigid fitment which is prone to failure. The ethylene-based polymer with HSIT from 65° C. to 125° C. enables lower heat sealing pressure/temperature during container fabrication. Lower heat seal pressure/temperature results in lower stress at the fold points of the gusset, and lower stress at the union of the films in the top segment and in the bottom segment. This improves film integrity by reducing wrinkling during the container fabrication. Reducing stresses at the folds and seams improves the finished container mechanical performance. The low HSIT ethylene-based polymer seals at a temperature below what would cause the outer layer to be compromised.

In an embodiment, the flexible multilayer film is a coextruded and/or laminated five layer, or a coextruded (or laminated) seven layer film having at least one layer containing a material selected from LLDPE, OPET, OPP (oriented polypropylene), BOPP, and polyamide.

In an embodiment, the flexible multilayer film is a coextruded and/or laminated five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminated) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

FIG. 5 shows an enlarged view of the bottom seal area 33 (Area 5) of FIG. 1 and the front panel 26*a*. The fold lines 60 and 62 of respective gusset panels 18, 20 are separated by a distance U that is from 0 mm, or greater than 0 mm, or 0.5 mm, or 1.0 mm, or 2.0 mm, or 3.0 mm, or 4.0 mm, or 5.0 mm to 12.0 mm, or greater than 60.0 mm (for larger containers, for example). In an embodiment, distance U is from greater than 0 mm to less than 6.0 mm. FIG. 6 shows line A (defined by inner edge 29*a*) intersecting line B (defined by inner edge 29*b*) at apex point 35*a*. BDISP 37*a* is on the distal inner seal arc 39*a*. Apex point 35*a* is separated from BDISP 37*a* by a distance S having a length from greater than 0 mm, or 1.0 mm, or 2.0 mm, or 2.6 mm, or 3.0 mm, or 3.5 mm, or 3.9 mm to 4.0 mm, or 4.5 mm, or 5.0 mm, or 5.2 mm, or 5.5 mm, or 6.0 mm, or 6.5 mm, or 7.0 mm, or 7.5 mm, or 7.9 mm.

In FIG. 5, an overseal 64 is formed where the four peripheral tapered seals 40*a*-40*d* converge in the bottom seal area 33. The overseal 64 includes 4-ply portions 66, where a portion of each panel is heat sealed to a portion of every other panel. Each panel represents 1-ply in the 4-ply heat seal. The overseal 64 also includes a 2-ply portion 68 where two panels (front panel 22 and rear panel 24) are sealed together. Consequently, the "overseal," as used herein, is the area where the peripheral tapered seals 40*a*-40*d* converge that is subjected to a subsequent heat seal operation (and subjected to at least two heat seal operations altogether). The overseal is located in the peripheral tapered seals 40*a*-40*d* and does not extend into the chamber of the flexible container 10.

Overseal 64 reduces, or eliminates, channel leakage in the bottom section of the flexible container. FIG. 5 shows the geometric shape of overseal 64 as a rectangle. It is understood overseal 64 can be configured to be other geometric shapes including such nonlimiting shapes as circle, semicircle, trapezoid, square, and arch.

In an embodiment, the apex point 35*a* is located above the overseal 64. The apex point 35*a* is separated from, and does not contact the overseal 64. The BDISP 37*a* is located above the overseal 64. The BDISP 37*a* is separated from and does not contact the overseal 64.

In an embodiment, the apex point 35*a* is located between the BDISP 37*a* and the overseal 64, wherein the overseal 64 does not contact the apex point 35*a* and the overseal 64 does not contact the BDISP 37*a*.

The distance between the apex point 35*a* to the top edge of the overseal 64 is defined as distance W, shown in FIG. 5. In an embodiment, the distance W has a length from 0 mm, or greater than 0 mm, or 2.0 mm, or 4.0 mm to 6.0 mm, or 8.0 mm, or 10.0 mm or 15.0 mm.

When more than four webs are used to produce the container, the portion 68 of the overseal 64 may be a 4-ply, or a 6-ply, or an 8-ply portion.

In an embodiment, the flexible container 10 has a vertical drop test pass rate from 90%, or 95% to 100%. The vertical drop test is conducted as follows. The container is filled with tap water to its nominal capacity, conditioned at 25° C. for at least 3 hours, held in upright position from its top handle 12 at 1.5 m height (from the base or side of the container to the ground), and released to a free fall drop onto a concrete slab floor. If any leak is detected immediately after the drop, the test is recorded as a failure. A minimum of twenty flexible containers are tested. A percentage for pass/fail containers is then calculated.

In an embodiment, the flexible container 10 has a side drop pass rate from 90%, or 95% to 100%. This side drop test is conducted as follows. The container is filled with tap water to its nominal capacity, conditioned at 25° C. for at least 3 hours, held in upright position from its top handle 12. The flexible container is released on its side from a 1.5 m height to a free fall drop onto a concrete slab floor. If any leak is detected immediately after the drop, the test is recorded as failure. A minimum of twenty flexible containers are tested. A percentage for pass/fail containers is then calculated.

In an embodiment, the flexible container 10 passes the stand-up test where the package is filled with water at ambient temperature and placed on a flat surface for seven days and it should remain in the same position, with unaltered shape or position.

In an embodiment, the flexible container 10 has a volume from 0.050 liters (L), or 0.1 L, or 0.15 L, or 0.2 L, or 0.25 L, or 0.5 L, or 0.75 L, or 1.0 L, or 1.5 L, or 2.5 L, or 3 L, or 3.5 L, or 4.0 L, or 4.5 L, or 5.0 L to 6.0 L, or 7.0 L, or 8.0 L, or 9.0 L, or 10.0 L, or 20 L, or 30 L.

The flexible container 10 can be used to store any number of flowable substances therein. In particular, a flowable food product can be stored within the flexible container 10. In one aspect, flowable food products such as salad dressings; sauces; dairy products; mayonnaise; mustard; ketchup; other condiments; syrup; beverages such as water, juice, milk, carbonated beverages, beer, or wine; animal feed; pet feed; and the like can be stored inside of the flexible container 10.

The flexible container 10 is suitable for storage of other flowable substances including, but not limited to, oil, paint, grease, chemicals, suspensions of solids in liquid, and solid particulate matter (powders, grains, granular solids).

The flexible container 10 is suitable for storage of flowable substances with higher viscosity and requiring application of a squeezing force to the container in order to discharge. Nonlimiting examples of such squeezable and flowable substances include grease, butter, margarine, soap, shampoo, animal feed, sauces, and baby food.

2. Fitment

The present flexible container includes a fitment 70 inserted into the neck 30 of the flexible container 10. The fitment 70 is composed of one or more polymeric materials. A top portion of the fitment 70 may include threads or other suitable structure for attachment to a closure. Nonlimiting examples of suitable fitments and closures, include, screw cap, flip-top cap, snap cap, liquid or beverage dispensing fitments (stop-cock or thumb plunger), Colder fitment connector, tamper evident pour spout, vertical twist cap, horizontal twist cap, aseptic cap, vitop press, press tap, push on tap, lever cap, conro fitment connector, and other types of removable (and optionally reclosable) closures. The closure and/or fitment 70 may or may not include a gasket. In an embodiment, the closure is watertight. In a further embodiment, the closure provides a hermetic seal to the container 10.

The fitment 70 is welded, or is otherwise heat sealed, to the multilayer film that forms the neck 30. In other words, the fitment 70 is welded to the neck 30. Heat sealing can be made by means of hot bar, impulse seal, ultrasonic or in some cases by high frequency (HF) sealing.

The fitment 70 is made from a polymeric material. Nonlimiting examples of suitable polymeric materials include propylene-based polymer, ethylene-based polymer, polyamides (such as Nylon 6; Nylon 6,6; Nylon 6,66; Nylon 6,12; Nylon 12; and the like), cyclic olefin copolymers (COC)(such as TOPAST™ or APEL™), polyesters (crystalline and amorphous), copolyester resin (such as PETG), cellulose esters (such as polylactic acid (PLA)), and combinations thereof.

3. Dispensing Pump

Figure 3A:
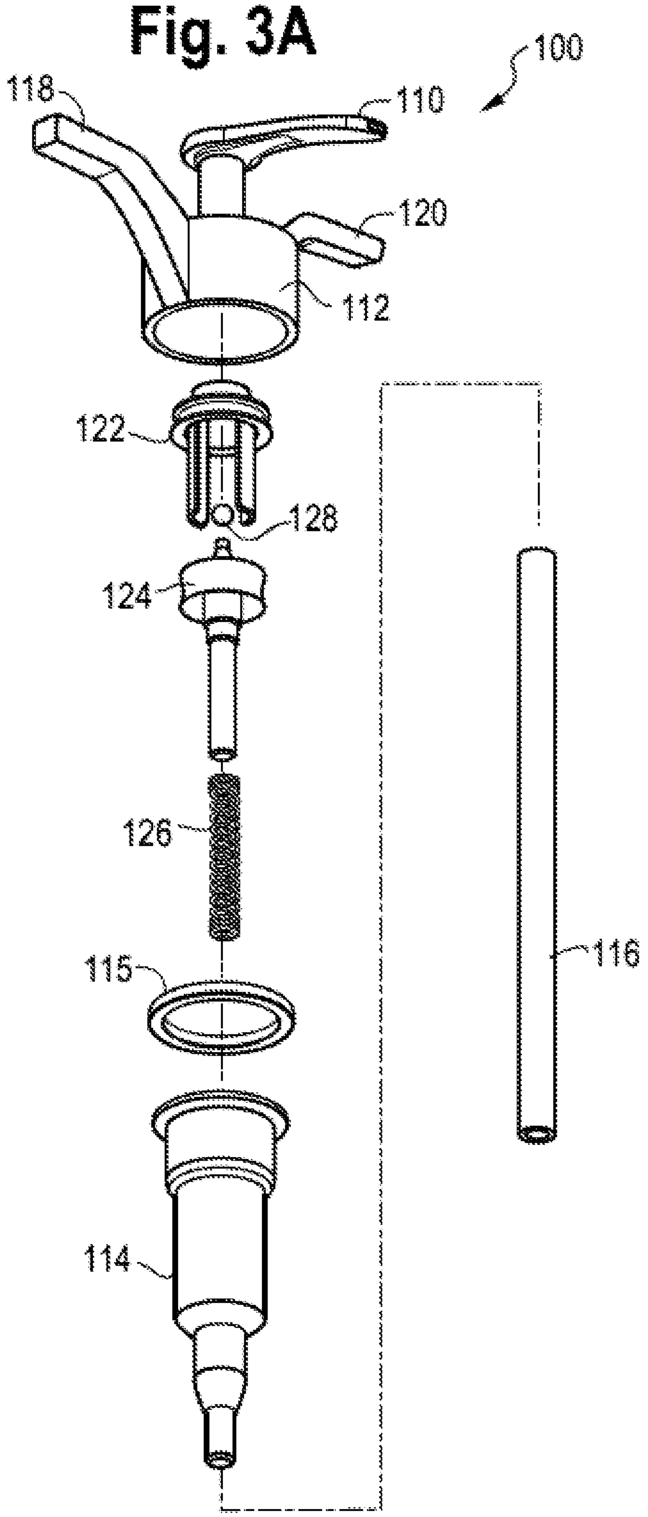
FIG. 3A is an exploded perspective view of the dispensing pump of FIG. 3.

A dispensing pump 100 is attached to the fitment 70. FIGS. 3 and 3A show the components of the dispensing pump. Dispensing pump 100 includes an actuator 110 and a closure 112. A proximate end of a housing 114 is attached to an interior portion of the closure 112. Sandwiched between the closure and the proximate end of the housing 114 is a gasket 115 for a fluid-tight seal between the closure and the housing. Housing 114 extends below the closure 112. A dip tube 116 is attached to a distal end of the housing 114. The housing 114 holds the pump components in place. The housing 114 also is a transfer chamber that sends the fluid contents of the flexible container from the dip tube 116 to the actuator 110. The actuator 110 is what a person presses down to pump the fluid contents out of the flexible container, the fluid contents ultimately dispensed from the actuator 110. The housing 114 is made of a rigid polymeric material such as polypropylene or HDPE.

The actuator 110 and the closure 112 each may be made from a rigid polymeric material (such as polypropylene or HDPE) or a metal. The closure 112 provides attachment between the dispensing pump 100 and the fitment 70. The closure 112 may include structure for permanent attachment or releasable attachment to the fitment 70. In an embodiment, the closure 112 is releasably attachable to the fitment 70. The inner surface of the closure 112 includes threads which operatively mate, and interlock, with threads on the exterior surface of the fitment 70. The interlocking threads provide releasable attachment between the closure 112 and the fitment 70.

The exterior surface of the closure 112 may be textured for enhanced grip. The closure 112 includes a first wing 118 and a second wing 120. Wings 118, 120 are on opposing sides of the closure 112, the wings are arranged in a linear manner. In an embodiment, the closure 112 and the wings 118, 120 are an integral and unitary structure and molded of a single rigid polymeric material such as polypropylene or HDPE.

In an embodiment, one or both wings 118, 120 include a hinge. The hinge enables each wing to be retracted to reduce the length of each wing and extended to increase the length of each wing.

In an embodiment, each wing includes a finger hole.

FIG. 3A shows the pump components located within housing 114. Housing 114 holds components to actuate the pumping of contents, namely, a stem 122, a piston 124, a spring 126, and a ball 128. The dispensing pump 100 draws fluid content from the flexible container through the dip tube

116, through the housing, and eventually to and through the actuator 110. The dip tube 116 is made of polymeric material. The dip tube 116 extends to the bottom of the flexible container when the flexible container 10 is in the expanded configuration in order to maximize fluid content usage.

In an embodiment, the dip tube 116 is composed of a polymeric material that is an elastomeric material. The dip tube 116 composed of elastomeric material is advantageous because it allows for the flexible container 10 to be more stackable. Elastomeric dip tube permits the dip tube to be bendable thereby reducing puncture potential.

The actuator 110 is rotatable between an open position and a closed position. In the open position, the actuator 110 is extended enabling operation of the dispensing pumping 110 (i.e., enabling the pumping motion of the actuator 110). FIGS. 8B and 9 show actuator 110 in the open position. In the closed position, the actuator 110 is retracted (pushed down) and rotated (typically a 90° rotation) to place the actuator 110 in line with the wings 118, 120. In the closed position, the actuator 110 is locked and retracted, the actuator 110 unable to perform the pumping operation. FIGS. 3, 6, and 7 show actuator 110 in the closed position.

In the open position, when a person presses down on the actuator 110, the piston 124 moves to compress the spring 126 and the upward air pressure draws the ball 128 upwards, along with the fluid content inside, into the dip tube 116 and subsequently into the housing chamber. As the user releases the actuator 110, the spring 126 returns the piston 124 and actuator 110 into an extended position, and the ball 128 is returned to a rest position, sealing the housing chamber and preventing fluid content from flowing back down into the flexible container. This initial cycle is called “priming”. When the user presses down on the actuator 110 again, the fluid content that is already in the housing chamber will be drawn from the housing chamber, through the stem 122 and actuator 110, the fluid content dispensed out of the dispensing pump 100.

As shown in FIGS. 2-3 and in FIG. 6, each leg 13, 15 of the handle 12 includes, or is otherwise formed from, three panels—the front panel, the rear panel and one of the folded gusset panels. Leg 13 of the handle is formed from a portion of the front panel, a portion of the rear panel, and a portion of the first gusset panel that is folded. The folded first gusset panel is shown in FIG. 2. The leg 15 is formed from a portion of the front panel, a portion of the rear panel, and a portion of the second gusset panel that is folded. The folded second gusset panel is shown in FIG. 2.

FIGS. 3, 6, 7, 8A and 8B show each leg 13, 15 includes a respective tack point 130*a*, 130*b*. A “tack point,” as used herein, is a heat seal structure configured, or otherwise located, between four plies of panels—front panel (1-ply), rear panel (1-ply), and one folded gusset panel (2-plies, see FIG. 2). A hole is present in each respective fold section of the gusset panel. With the gusset panel folded, the holes are aligned such that a portion of the front panel seal layer directly contacts a portion of the rear panel seal layer (the term “directly contacts” denoting no intervening structure between layers touching each other). Each tack point is formed from a heat seal procedure under pressure and elevated temperature; the tack point (i) having a two-ply heat seal structure whereby the front panel is directly heat sealed to the rear panel (2-ply); (ii) sides of the 2-ply heat seal structure surrounded by the folded gusset panel (vis-à-vis the gusset panel holes), and (iii) optionally a portion of the two-ply heat seal structure further heat sealing with portions of seal layers for one or both folds of gusset panel to form three-ply heat seal structure portions and/or four-ply heat seal structure portions.

FIG. 3 shows that below each tack point 130*a*, 130*b*, each leg 13, 15 opens and branches into a front leg portion and a rear leg portion, the front/rear leg portions extending from the upper handle portion 12*a* to the tapered transition section III of the flexible container. The branching of the front/rear leg portions enable the wings 118, 120 to be inserted between the leg portions and underneath each respective tack point 130*a*, 130*b*. Wing 118 is inserted between front leg portion and rear leg portion of leg 13. Wing 120 is inserted between front leg portion and rear leg portion of leg 15. Once inserted between front leg portion and rear leg portion of leg 13, wing 118 contacts tack point 130*a*. Similarly, once wing 120 is inserted between front leg portion and rear leg portion of leg 15, wing 120 contacts tack point 130*b*.

FIGS. 3, 6 and 7 show flexible container 10 in a transport configuration. In the transport configuration:

(i) actuator 110 is in the closed position;

(ii) wing 118 is located between front leg portion and rear leg portion of leg 13 and wing 118 is in contact with tack point 130*a*; and (iii) wing 120 is located between front leg portion and rear leg portion of leg 15 and wing 120 is in contact with tack point 130*b*.

In the transport configuration, a person (hand 200) grasps the underside of wings 118, 120 and lifts the flexible container 10 as shown in FIG. 7. The upward lifting force brings wings 118, 120 into intimate contact with respective tack points 130*a*, 130*b*, with the gravitational pull of the fluid content (arrow 210 in FIG. 7) bringing the wings 118, 120 to impinge upon the underside of respective tack points 130*a*, 130*b* (hereafter “wing-tack point impingement”). As shown in FIG. 7, in the transport configuration, the flexible container 10 is supported by the wing—tack point impingement, with body 47 freely suspended from the wing—tack point impingement. Bounded by no particular theory, the wing-tack point impingement reduces the load of the filled flexible container on the fitment, transferring the load through the handle instead.

The flexible container 10 has a dispensing configuration. In the dispensing configuration:

(i) actuator 110 is in the open position;

(ii) at least one wing is removed from between its respective front leg portion and rear leg portion; and (iii) at least one wing is out of contact with its respective tack point.

Figure 8A:
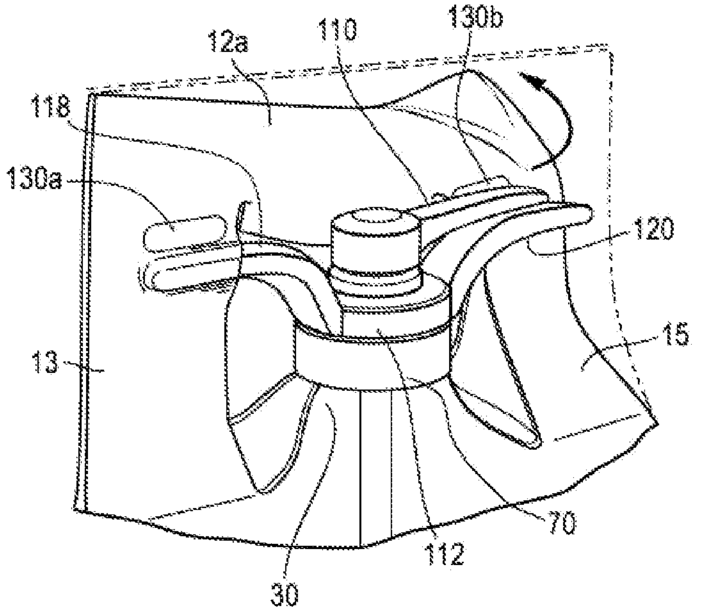
FIG. 8A and FIG. 8B each is a perspective view of Area 8 of FIG. 7, FIG. SA and FIG. 8B showing transition of the flexible container from the transport configuration to a dispensing configuration, in accordance with an embodiment of the present disclosure.
Figure 8B:
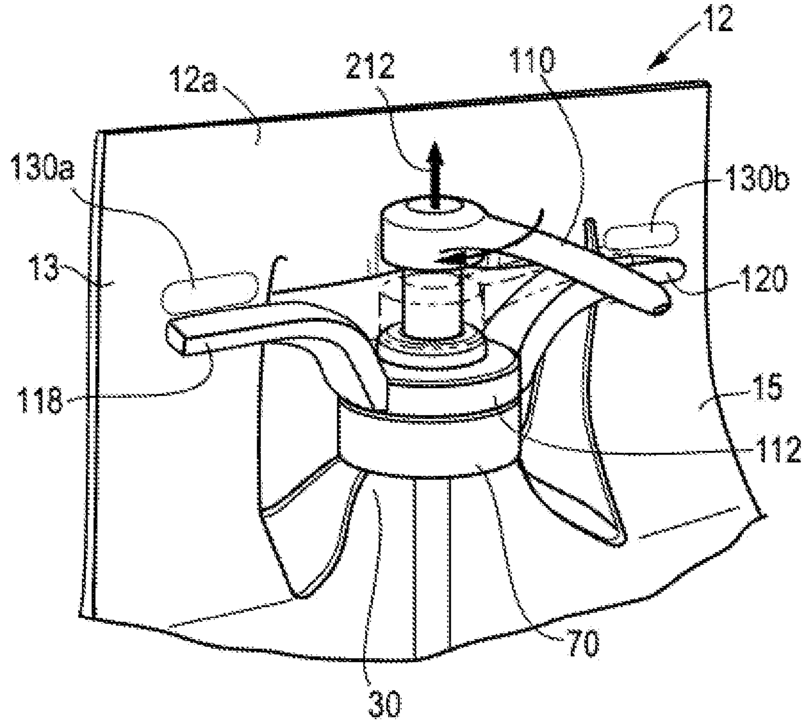

FIG. 8A shows wing 120 being removed from between front leg portion and rear leg portion of leg 15. Removal of wing 120 from between the front/rear leg portion of leg 15 takes wing 120 out of contact with tack point 130*b*. FIG. 8B shows wing 118 being removed from between front leg portion and rear leg portion of leg 13. Removal of wing 118 from between the front/rear leg portion of leg 13 takes wing 118 out of contact with tack point 130*a*. Upper handle portion 12*a* is now free to be pulled away, enabling a person to move (rotate) actuator 110 to the open position, as shown by up-arrow 212 in FIG. 8B.

In the dispensing configuration, bottom end 46 supports flexible container 10 on a support surface 214 as shown in FIG. 9. The linear arrangement of wings 118, 120 on either side of actuator 110 enables one-handed operation of dispensing pump 100 in the dispensing configuration. FIG. 9 shows single-hand operation of dispensing pump 100 whereby thumb of hand 200 pumps actuator 110 and fingers of hand 200 grip the underside of wings 118, 120 to dispense fluid content (in this example, ketchup) from the actuator 110. Second hand 300 of the person is free for other activity, such as preparing a delicious hot dog for enjoyment, for example. In this way, the present flexible container 10 advantageously enables single-hand transport of the flexible container and also enables single-hand operation of dispensing pump 100.

The present flexible container may comprise two or more embodiments disclosed herein.

DEFINITIONS

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

Clarity is measured in accordance with ASTM-D1746.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D792.

An "ethylene-based polymer," as used herein is a polymer that contains more than 50 mole percent polymerized ethylene monomer (based on the total amount of polymerizable monomers) and, optionally, may contain at least one comonomer.

Haze is measured in accordance with ASTM D1003 (method B) and noting the thickness of the part.

The term "heat seal initiation temperature," is minimum sealing temperature required to form a seal of significant strength, in this case, 2 lb/in (8.8N/25.4 mm). The seal is performed in a Topwave HT tester with 0.5 seconds dwell time at 2.7 bar (40 psi) seal bar pressure. The sealed specimen is tested in an Instron Tensiomer at 10 in/min (4.2 mm/sec or 250 mm/min).

Melt flow rate (MFR) is measured I accordance with ASTM D1238, Condition 280° C./2.16 kg (g/10 minutes).

Melt index (MI) is measured in accordance with ASTM D1238, Condition 190° C./2.16 kg (g/10 minutes).

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/$\alpha$-olefin polymer" and "propylene/$\alpha$-olefin polymer" are indicative of copolymer as described above prepared from polymerizing ethylene or propylene respectively and one or more additional, polymerizable $\alpha$-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A flexible container comprising:

A. four panels, each panel comprising a flexible multilayer film comprising a polymeric material, the four panels forming
(i) a body,
(ii) a neck, and
(iii) a handle, the handle having an upper handle portion and a pair of spaced-apart legs, the legs extending from the upper handle portion to the body on opposing sides of the neck, wherein each handle leg comprises a respective tack point;

B. a fitment sealed to the neck; and

C. a dispensing pump attached to the fitment, wherein the dispensing pump comprises
(i) a closure attached to the fitment; and
(ii) a pair of wings extending from opposing sides of the closure, wherein each wing contacts a respective tack point.

2. A flexible container comprising:

A. four panels, each panel comprising a flexible multilayer film comprising a polymeric material, the four panels forming
(i) a body,
(ii) a neck, and
(iii) a handle, the handle having an upper handle portion and a pair of spaced-apart legs, the legs extending from the upper handle portion to the body on opposing sides of the neck, wherein each handle leg comprises a respective tack point;

B. a fitment sealed to the neck; and

C. a dispensing pump attached to the fitment, wherein the dispensing pump comprises (i) a closure attached to the fitment; and (ii) a pair of wings extending from opposing sides of the closure, wherein each wing contacts a respective tack point wherein the dispensing pump comprises an actuator and the flexible container has D. a transport configuration, the transport configuration comprising (i) the actuator in a closed position, and (ii) each wing located between a front leg portion and a rear leg portion for a respective leg.

3. A flexible container comprising:

A. four panels, each panel comprising a flexible multi-layer film comprising a polymeric material, the four panels forming (i) a body, (ii) a neck, and (iii) a handle, the handle having an upper handle portion and a pair of spaced-apart legs, the legs extending from the upper handle portion to the body on opposing sides of the neck, wherein each handle leg comprises a respective tack point;

B. a fitment sealed to the neck; and

C. a dispensing pump attached to the fitment, wherein the dispensing pump comprises (i) a closure attached to the fitment; and (ii) a pair of wings extending from opposing sides of the closure, wherein each wing is contactable with a respective tack point wherein the dispensing pump comprises an actuator and the flexible container has D. a transport configuration, the transport configuration comprising (i) the actuator in a closed position, and (ii) each wing located between a front leg portion and a rear leg portion for a respective leg wherein the flexible container has E. a dispensing configuration, the dispensing configuration comprising (i) the actuator in an open position, (ii) at least one wing is removed from between its respective front leg portion and the rear leg portion, and (iii) at least one wing is out of contact with its respective tack point.

* * * * *